(12) United States Patent
Richter et al.

(10) Patent No.: US 11,872,654 B2
(45) Date of Patent: Jan. 16, 2024

(54) DEVICE FOR LASER STRUCTURING A SURFACE OF A THROUGH OPENING IN A COMPONENT

(71) Applicants: Volkswagen Aktiengesellschaft, Wolfsburg (DE); Laser Zentrum Hannover e.V., Hannover (DE)

(72) Inventors: Stefan Richter, Roetgesbuettel (DE); Joachim Woehle, Isernhagen (DE); Mike Hirschfeldt, Braunschweig (DE); Marius Lammers, Hildesheim (DE); Joerg Hermsdorf, Isernhagen (DE)

(73) Assignees: Volkswagen Aktiengesellschaft, Wolfsburg (DE); Laser Zentrum Hannover EV, Hannover (DE)

( * ) Notice: Subject to any disclaimer, the term of this patent is extended or adjusted under 35 U.S.C. 154(b) by 671 days.

(21) Appl. No.: 16/933,760

(22) Filed: Jul. 20, 2020

(65) Prior Publication Data
US 2021/0016391 A1 Jan. 21, 2021

(30) Foreign Application Priority Data
Jul. 18, 2019 (DE) ...................... 10 2019 119 466.0

(51) Int. Cl.
*B23K 26/12* (2014.01)
*B23K 26/352* (2014.01)
*B23K 26/08* (2014.01)

(52) U.S. Cl.
CPC ........ *B23K 26/125* (2013.01); *B23K 26/0869* (2013.01); *B23K 26/352* (2015.10)

(58) Field of Classification Search
CPC .... B23K 26/035; B23K 26/382; B23K 26/38; B23K 26/362; B23K 26/36; B23K 26/355;
(Continued)

(56) References Cited

U.S. PATENT DOCUMENTS

2018/0369852 A1* 12/2018 Pettit .................... B05B 15/555

FOREIGN PATENT DOCUMENTS

CN 1330727 A 1/2002
CN 1886263 A 12/2006
(Continued)

OTHER PUBLICATIONS

Chinese Office Action dated Jul. 5, 2022 in corresponding application 202010679072.9.

*Primary Examiner* — Nathaniel E Wiehe
*Assistant Examiner* — Theodore J Evangelista
(74) *Attorney, Agent, or Firm* — Muncy, Geissler, Olds & Lowe, P.C.

(57) ABSTRACT

A device for structuring a surface of a through opening in a component, in particular a cylinder opening of a cylinder crankcase for an internal combustion engine. The device comprises a lance, which can be moved into the through opening by a displacement device. The lance has means for emitting a laser beam from a laser light source in the direction of the surface of the through opening. A preferably plate-shaped cover is provided, which is designed for placement on an end face of the component. The cover forms a passage opening which is dimensioned such that the lance can be moved through it. A compressed gas feed is integrated into the cover and comprises a connector for connecting to a compressed gas source and forms one or more outlet openings at the edge of the passage opening.

16 Claims, 6 Drawing Sheets

(58) Field of Classification Search
CPC .... B23K 26/354; B23K 26/352; B23K 26/18;
B23K 26/16; B23K 26/142; B23K 26/14;
B23K 26/127; B23K 26/125; B23K
26/123; B23K 26/12; B23K 26/106;
B23K 26/103; B23K 26/10; B23K
26/0884; B23K 26/0876; B23K 26/0869;
B23K 26/08; B23K 26/062; B23K
26/046; B23K 26/042; B23K 26/04;
B23K 26/02; B23K 26/0096; B23K
26/0093; B23K 26/00
See application file for complete search history.

(56) References Cited

FOREIGN PATENT DOCUMENTS

| | | | | |
|---|---|---|---|---|
| CN | 104148804 A | * | 11/2014 | ............. B23K 15/08 |
| CN | 104148804 A | | 11/2014 | |
| CN | 108323161 A | | 7/2018 | |
| CN | 109475968 A | | 3/2019 | |
| DE | 198 17 091 A1 | | 10/1999 | |
| DE | 199 36 393 A1 | | 2/2001 | |
| DE | 10 2016 103 578 A1 | | 8/2017 | |
| DE | 10 2017 108 269 A1 | | 10/2018 | |
| EP | 2 799 180 A2 | | 11/2014 | |
| JP | 2016-068138 A | | 5/2016 | |
| WO | WO 2005/053896 A1 | | 6/2005 | |

\* cited by examiner

DEVICE FOR LASER STRUCTURING A SURFACE OF A THROUGH OPENING IN A COMPONENT

This nonprovisional application claims priority under 35 U.S.C. § 119(a) to German Patent Application No. 10 2019 119 466.0, which was filed in Germany on Jul. 18, 2019, and which is herein incorporated by reference.

BACKGROUND OF THE INVENTION

Field of the Invention

The present invention relates to a device for laser structuring a surface of a through opening in a component. The invention also relates to a combination of such a device and a component to be structured by means of this device, wherein the component can in particular be a cylinder crankcase for a reciprocating piston combustion engine and the through opening can in particular be a cylinder opening of the cylinder crankcase or of the combustion engine.

Description of the Background Art

Particularly in the case of reciprocating piston combustion engines, hereinafter referred to in short as combustion engines, in which the cylinder crankcases consist of light metals, at least those sections of the upper or wall surfaces of the cylinder openings, formed in the cylinder crankcases, in which the cyclic-linear movement of the pistons received therein takes place, are provided with cylinder bores made of materials that differ from the materials of the cylinder crankcase, in particular to increase wear resistance and to realize the lowest possible frictional resistance. The integration of inherently dimensionally stable cylinder liners, for example, made of gray cast iron, into cylinder crankcases is widespread, wherein the cylinder liners can be recast, for example, when the cylinder crankcase is cast. An at least partial coating of the surfaces of the cylinder openings formed in cylinder crankcases is also widespread, for example, by thermal spraying, i.e., by spraying a molten, usually metallic material onto the surfaces of the cylinder openings, wherein the coating layers produced thereby form the cylinder running surfaces of the cylinder openings after the coating materials have hardened.

In the case of such a coating of surfaces of the cylinder openings of cylinder crankcases, sufficient adhesion of the coating layers to the surfaces of the cylinder openings must be ensured. Roughening or the creation of structuring of the surfaces is often necessary for this in order to achieve a very marked penetration of the coating layer materials into the cylinder crankcase materials.

Such structuring of the surfaces of cylinder openings of cylinder crankcases can occur, for example, by blasting with fine-grained solids (particles). Alternatively, structuring by means of laser beams is also known, in which in particular a pulsed laser beam is emitted in the direction of a surface to be structured and is thereby moved along this surface. The laser beam impinging on the surface evaporates the material there and thereby forms depressions which, in combination with one another, represent the surface structuring to be formed.

Such a method and a device used thereby are known, for example, from EP 2 799 180 A2, which is incorporated herein by reference. The device described therein comprises a tubular lance which can be moved into the cylinder opening in the axial direction, i.e., along its longitudinal axis, and can also be driven rotatably about its longitudinal axis. At its lower end, i.e., which is lowered into the cylinder opening, the lance forms a passage opening from which the laser beam can emerge in the exact radial direction and can thus strike the cylinder opening surface to be structured in the vertical direction. This laser beam is generated by a laser light source, wherein the laser beam is introduced by the laser light source into the lance in a coaxial orientation with respect to the longitudinal axis of the lance and is deflected in the exactly radial direction by means of a mirror or prism.

When structuring a surface of a through opening by means of a laser, particles can arise, in particular as a result of a subsequent condensation of the evaporated material still within the cylinder opening, and these can lead to the soiling of the surface of the through opening and the lance and other components of the device used for the structuring. In addition to a cleaning effort, this can in the long term lead to impairment of the exiting of the laser beam from the lance and thus to a negative impact on the structuring result.

In order to avoid such soiling or to keep it to a minimum, the method disclosed in EP 2 799 180 A2 provides for air to be allowed to flow through the lance or through the annular space formed between the lance and the surface of the cylinder opening. The particles are discharged from the lance or the cylinder opening by means of the air flow.

DE 198 17 091 A1 describes a method for coating cylinder openings in a cylinder crankcase, in which silicon powder is introduced into the cylinder openings by means of a conveying and protective gas flow and, in addition, a plasma of the silicon powder is generated by means of a laser beam, as a result of which after cooling and hardening it is bonded to the surfaces of the cylinder openings and thereby forms a coating layer in each case. A gas flow is also used there to keep the soiling of the optics, by means of which the laser beam is emitted, by the silicon powder at a minimum.

DE 199 36 393 A1 discloses a method for coating the surface of a cylinder opening of a cylinder crankcase by means of thermal spraying, wherein a mist of the coating material is drawn off by suction at the two ends of the cylinder opening.

SUMMARY OF THE INVENTION

It is therefore an object of the present invention to prevent soiling of a lance by means of which a laser beam is directed onto a surface of a through opening of a component, in particular onto a cylinder opening of a cylinder crankcase for a combustion engine, in a simplest and simultaneously effective manner possible in order to structure this surface.

According to an exemplary embodiment of the invention, a device is provided for structuring a surface of a through opening in a component, in particular a cylinder opening of a cylinder crankcase for a (reciprocating piston) combustion engine. The device comprises at least one lance, which can be moved into the through opening by means of a displacement device, wherein the lance has an emitter for emitting a laser beam from a laser light source (which is preferably also part of the device) in the direction of the surface. A device of the invention can preferably further have a rotator for rotating the emitter relative to the component, for which purpose the lance and/or the emitter and/or the component can be driven rotatingly by means of a corresponding rotation device. Furthermore, a preferably plate-shaped cover is provided, which is designed for placement on a (first) end face of the component, wherein the cover forms a passage opening which is designed such that the lance can be moved through it. A face in which the through opening is formed or which has a mouth opening of the through opening is regarded as the end face of the component. According to the invention, such a device is further characterized by the integration of a compressed gas feed into the cover, wherein the compressed gas feed comprises a connector for connecting to a compressed gas source (which can also be part of the device) and forms one or more outlet openings at the edge of the passage opening.

A combination of the invention comprises at least one such device and a component which comprises one or more through openings, the surface(s) of which is (are) to be structured by means of the device. The component is preferably a cylinder crankcase for a (reciprocating piston) combustion engine and the through opening(s) is/are cylinder openings which are used to receive (in each case) a piston of the combustion engine when the cylinder crankcase is integrated into the combustion engine. If the component of a combination of the invention forms a plurality of through openings, it can preferably be provided that the cover is dimensioned such that the passage opening can be brought into overlap with each of the through openings, wherein the other through openings are then covered by the cover. As a result, soiling of the other through opening(s) can be prevented by the cover when machining or structuring one of the through openings.

The inventive integration of a compressed gas feed into the cover makes it possible to advantageously introduce compressed gas, which can preferably be compressed air, into the through opening, as a result of which particles of the material released from the surface of the through opening by the action of the laser beam can be removed particularly well. The soiling of the through opening and the lance and other components of the device of the invention can thereby be kept low. In particular, the integration of the compressed gas feed into the cover according to the invention enables the generation of a locally limited and precisely directed compressed gas flow. Such a compressed gas flow can also be used advantageously to cause a drawing in of an additional (secondary) flow of gas as the primary flow via the passage opening of the cover, so that a relatively large purge gas flow is available overall for discharging the particles out of the through opening.

The emitter for emitting the laser beam can in particular comprise a lance outlet region which is transparent to the laser beam and which can in particular be formed by a jacket opening or an outlet window of the lance. Furthermore, the emitter can comprise a deflection device for the laser beam, which has, for example, a prism and/or a mirror. This deflection device can be provided for deflecting the laser beam which is generated by the laser light source and can preferably be introduced into the lance coaxially with respect to the longitudinal axis thereof, and for directing it thereby onto the surface of the through opening to be structured. In principle, it is also possible to integrate the laser light source into the lance itself.

A particularly good removal of particles of the material, released from the surface of the through opening by the action of the laser beam, can be realized if, as is preferably provided, the outlet opening of the cover is designed to have a closed ring-shaped form. As a result, a compressed gas flow can be generated that is as uniform as possible along the entire extent of the surface of the through opening.

The outlet opening(s) can be designed to generate a compressed gas flow which is oriented radially, in particular exactly radially (i.e., perpendicularly) with respect to the longitudinal axis of the passage opening of the cover. Alternatively, a compressed gas flow can also be advantageous, which is oriented parallel to the longitudinal axis of the passage opening and points in the direction of one side of the cover, which is intended to abut the component.

A structurally particularly simple and therefore advantageous embodiment for a device of the invention can be realized if the cover comprises a base body and a cover part, which in combination with one another form or delimit the passage opening, wherein a gap or a plurality of gaps, located between the base body and the cover part, form the outlet opening(s).

The passage opening edge, which is located on the cover side facing away from the component, can be rounded. In this way, in particular an advantageous inflow of a secondary flow of gas, drawn in by the compressed gas flow, into the through opening can be realized, wherein the rounding of the passage opening edge can in particular prevent or keep low turbulences of this secondary flow.

As an advantageous addition to realizing the most advantageous flow possible through the through opening of the component by means of the compressed gas flow and optionally also by means of the secondary flow, drawn in by it, a suction device for drawing off gas out of the through opening can also be provided, wherein the suction device is designed for placement at the other (second) end face of the component (i.e., at that of the two end faces which is not intended for placement of the cover).

The lance can be designed such that the laser beam can be emitted at an angle, which is included by the longitudinal axis of the lance and deviates from 90° and is preferably greater than 45° (for example, 60°). As a result of the action of the laser beam, depressions can be made in the surface of the through opening which form undercuts with respect to the perpendicular to this surface, as a result of which particularly good adhesion of a coating layer subsequently applied to the surface thus structured can be realized.

Due to the angle included by the longitudinal axis of the lance and deviating from 90°, the laser beam can advantageously have an orientation in the direction of advance of the lance (i.e., in the direction in which the lance can be introduced into the through opening via the passage opening of the cover). With such an orientation of the laser beam, it can be realized in particular that a section of the (first) end face of the component, on which the cover is disposed, is structured; this can likewise have an advantageous effect on the bonding between the component and a subsequently applied coating layer. In order to enable such a structuring of a section of this end face of the component, it can preferably also be provided that the dimension(s) of the passage opening (in particular the diameter of the preferably circular passage opening) of the cover is larger in at least one section than the dimension(s) of the through opening(s) of the component (in particular the diameter of the preferably cylindrical through opening(s)). In this case, it can be provided in one respect that the passage opening has larger dimensions than the through opening(s) over its entire length (possibly with the exception of the rounded section). However, it is preferably provided that the passage opening is formed with larger dimensions only in a section that adjoins the side of the cover that is provided for abutting against the component. In another section of the passage opening, in contrast, the dimensions can preferably be selected to be smaller than or the same size as those of the through opening(s) of the component. This prevents the gas flow, passing through the passage opening of the cover into or into one of the through openings of the component, from being disturbed when flowing over the edge of the through opening, which could result in turbulences in this gas flow.

In such an embodiment of a cover of the invention, the section of the passage opening with enlarged dimensions represents an undercut which can at least slightly negatively influence the gas flow. It can therefore be advantageous to make this section as short as possible (with respect to the longitudinal direction of the passage opening). In order to then enable nevertheless a structuring of a section of the component end face adjacent to the cover in an advantageous manner, it can be advantageous if the passage opening in the section with enlarged dimensions is designed at least in sections such that it widens, in particular widens conically, in the direction of the component or in the direction of the side provided for abutting against the component. In this regard, it can particularly preferably be provided that the cone angle corresponds at least approximately (i.e., ±5° or ±3°) to the angle at which the laser beam can be emitted from the lance (at an angle included by the longitudinal axis of the lance, which deviates from 90°).

The "longitudinal axis" of a body or a cavity that has an annular, in particular circular, circumferential wall surface is understood to be the axis connecting the geometric centers of gravity of the different cross sections of this wall surface. In the case of differently shaped bodies or cavities, the longitudinal axis represents the axis that extends along the greatest extent of the respective body/cavity and thereby connects the geometric centers of gravity of the different cross sections along this extent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
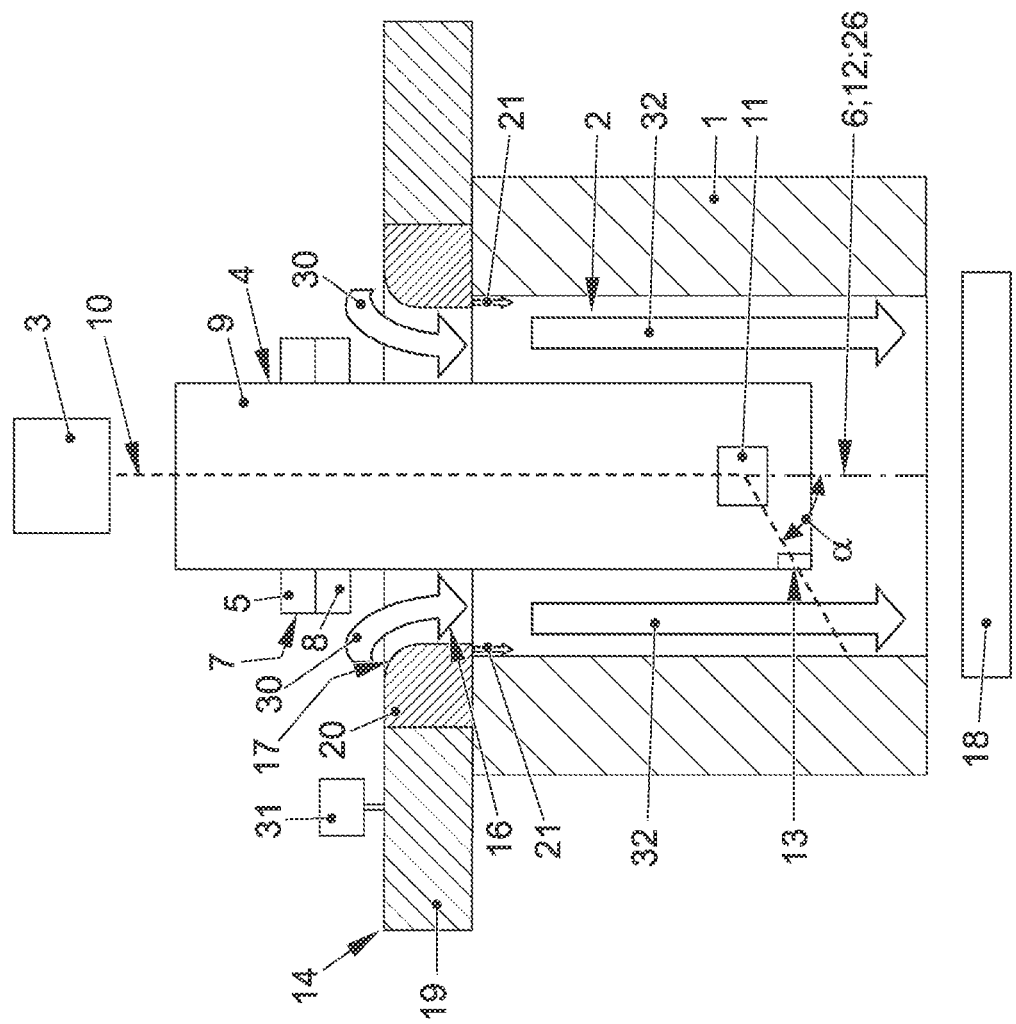
FIG. 1 schematically shows the use of a device of the invention for structuring a surface of a through opening of a component according to an exemplary embodiment.
Figure 3:
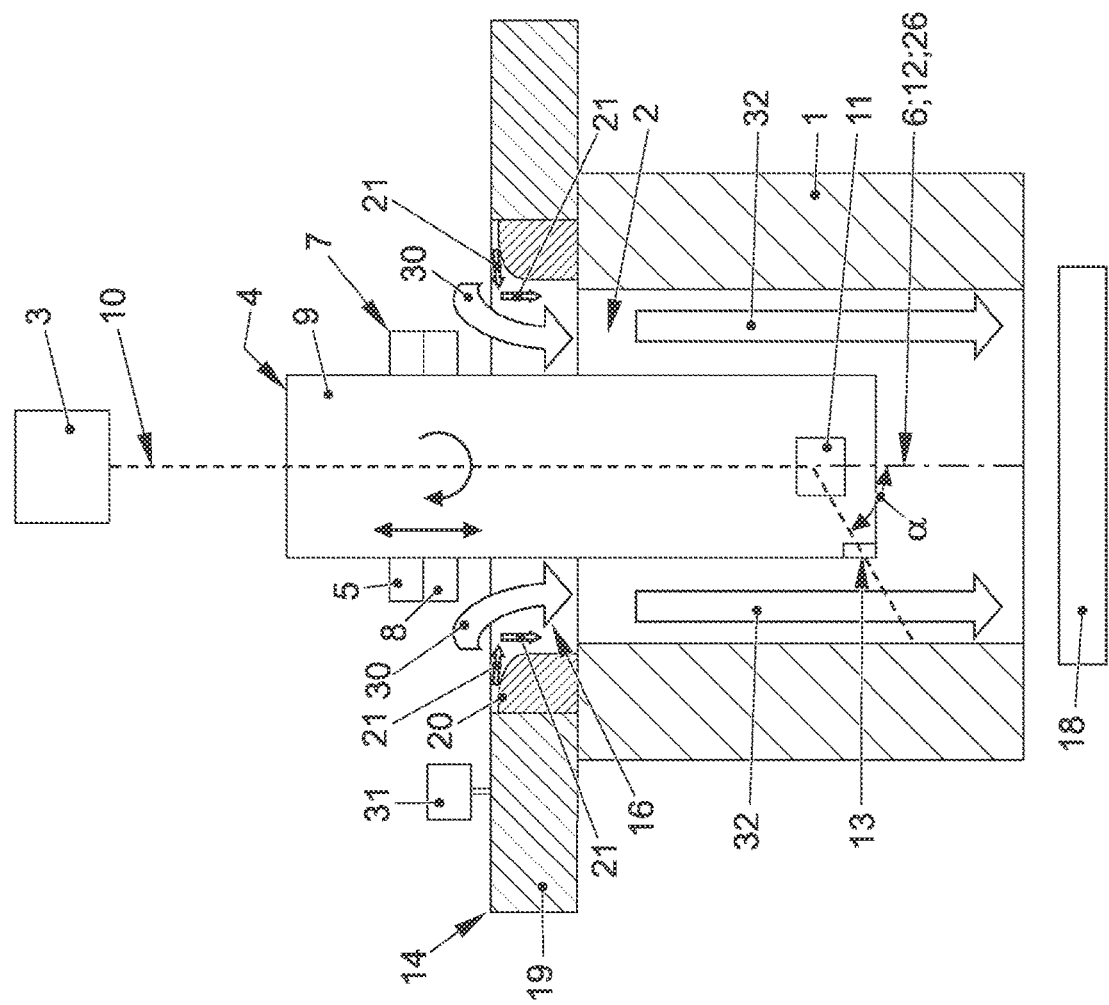
FIG. 3 schematically shows the use of a device of the invention for structuring a surface of a through opening of a component.

A device of the invention for structuring a surface of a through opening 2 of a component 1, which can in particular be a cylinder crankcase 1 of a combustion engine, in which a plurality of cylinder openings 2 are formed, for example, arranged in series, according to FIGS. 1 and 3 comprises a laser light source 3 and a lance 4, which can be moved axially, i.e., along longitudinal axis 6 of lance 4, into through opening 2 of component 1 by means of a displacement device 5. Displacement device 5 is a component of a drive device 7 which, in addition to displacement device 5, also comprises a rotation device 8, by means of which lance 4 can be driven rotatably about its longitudinal axis 6.

Lance 4 comprises a tubular jacket 9 with, for example, annular cross-sectional areas, wherein the inner volume enclosed by jacket 9 is preferably filled with air or another gas. However, a different type of filling of the inner volume is also possible with, for example, a solid, as long as permeability to a laser beam 10 generated by laser light source 3 is ensured.

Laser beam 10 generated by laser light source 3 is introduced in a direction, which is oriented coaxially with respect to longitudinal axis 6 of lance 4, into an inlet-side end of lance 4, the top end in FIGS. 1 and 3, and in the vicinity of an outlet-side end of lance 4, the bottom end in FIGS. 1 and 3, whose end face there is formed closed, strikes a deflecting device 11, which is immovably taken up in the inner volume of the lance (and only shown schematically in FIGS. 1 and 3) and has, for example, the form of a prism or a mirror. Deflection device 11 deflects laser beam 10 from the previously axial orientation into a radial orientation with respect to longitudinal axis 6 of lance 4 and thus also to longitudinal axis 12, coaxial therewith, of through opening 2, wherein it is provided that laser beam 10 is deflected by an angle α of 60°, which encloses laser beam 10 with longitudinal axis 6 of lance 4. The deflected laser beam 10 leaves lance 4 through an outlet 13 integrated into jacket 9, which can be designed, for example, in the form of an outlet opening or an outlet window permeable to laser beam 10, and strikes a small section of the surface of through opening 2 of the component. In this section, laser beam 10 leads to evaporation of the material which is close to the surface there and from which component 1 is made, as a result of which a depression is formed in the surface. The entire surface or only a defined longitudinal section thereof can be processed accordingly by means of laser beam 10 by the combination of the rotating drive and the axial movement of lance 4, which results in a changing immersion depth of lance 4 in through opening 2 of component 1, so that the plurality of depressions introduced by means of laser beam 10 represent a structuring of this surface.

The material of component 1, evaporated by the action of laser beam 10, can still condense to form small particles within through opening 2. In order to prevent these particles from soiling the surface of through opening 2, lance 4, in particular outlet 13 thereof, and, in an embodiment of outlet 13 as the outlet opening, deflection device 11, as well as a cover 14 of the device, a purge gas flow and specifically purge air flow 32 are generated; these flow through the annular gap, remaining on the outside of lance 4, of through opening 2 in the axial direction, i.e., along longitudinal axis 12 of through opening 2, and thereby remove the particles via the (second) end face of component 1 that is at a distance from laser light source 3.

Purge gas flow 32 is generated in that, in one respect, compressed gas 21, which comes from a compressed gas source 31, is introduced into the end, facing laser light source 3, of through opening 2 of component 1 or into the remaining annular gap thereof via an annular outlet opening 15, which is integrated at the edge of a passage opening 16 of cover 14 and which is part of a compressed gas feed of cover 14. This compressed gas flow 21 causes a suction, which ensures that further gas 30 (preferably air) is drawn in from the environment through passage opening 16 of cover 14 into through opening 2 of component 1. A rounded configuration of the edge 17 of passage opening 16 that is situated facing away from component 1 ensures that this drawn-in ambient gas 30 is introduced into through opening 2 as turbulence-free as possible. Furthermore, a sufficiently high flow rate of purge gas flow 32 is ensured in that a suction device 18 is disposed at the end of through opening 2 of component 1, said end facing away from laser light source 3.

Figure 5:
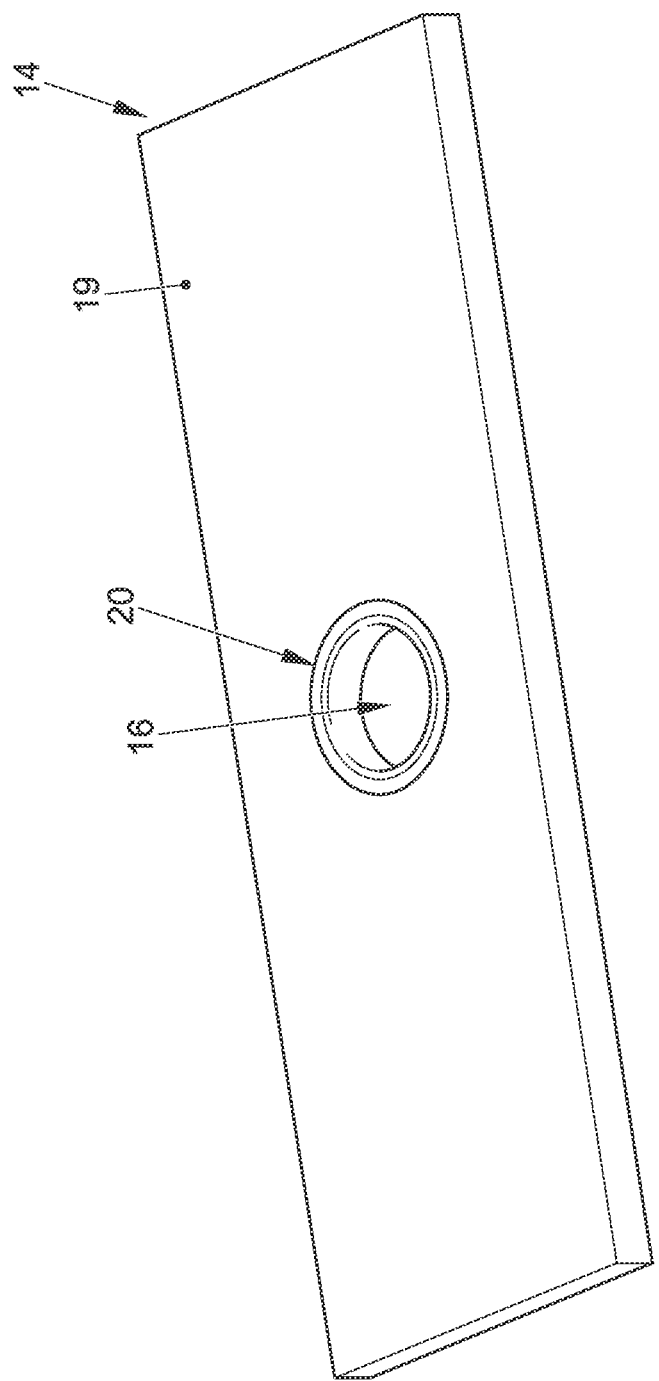
FIG. 5 shows in a perspective view a cover of a device of the invention.

Cover 14, according to FIG. 5, can comprise, for example, a rectangular base plate 19 which, in a central arrangement, has a receiving opening into which an annular nozzle insert 20 is inserted, which forms passage opening 16, outlet opening 15, and at least part of the compressed gas feed of cover 14. Base plate 19 of cover 14 is dimensioned such that passage opening 16 can be brought into a coaxial overlap with each of the plurality of through openings 2 of component 1, in particular with each of cylinder openings 2, arranged in series, of component 1, representing a cylinder crankcase 1 for a combustion engine, wherein then the remaining through openings 2 are covered on the end face of component 1 on which the cover is disposed adjacently.

In the device, as shown in FIG. 1, it is provided that the annular compressed gas flow 21, introduced into through opening 2 of component 1 via outlet opening 15 of cover 14, flows at the smallest possible distance from the surface and, when exiting, in a substantially parallel orientation to longitudinal axis 12 of through opening 2 or to the surface of through opening 2.

Figure 2:
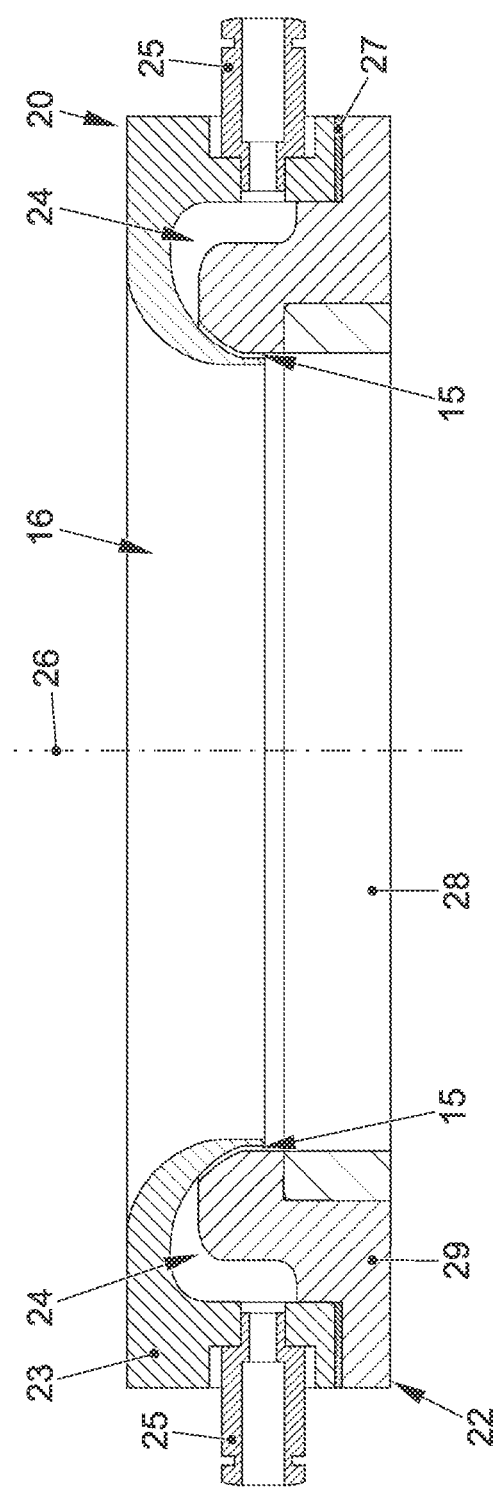
FIG. 2 shows in a longitudinal section a nozzle insert for a cover of a device of the invention.

A nozzle insert 20 of cover 14 that can be used for this purpose is shown in a specific embodiment in FIG. 2. Accordingly, this nozzle insert 20 comprises a base body 22, on which a cover part 23 is placed, wherein between base body 22 and cover part 23, a closed annular circumferential flow channel 24 is formed, which serves to distribute compressed gas 21, supplied via a plurality of compressed gas connections 25 opening into this flow channel 24, over the full extent of passage opening 16 of cover 14, said opening being formed or delimited by base body 22 and cover part 23 in combination. This produces a compressed gas flow 21 which is as uniform as possible over this extent. Outlet opening 15 of nozzle insert 22 and thus of cover 14 is formed by an annular gap which lies between base body 22 and cover part 23 and has a significantly smaller gap width compared with flow channel 24 and a parallel orientation with respect to longitudinal axis 26 of passage opening 16. An annular sealing element 27, which is disposed between the exactly radially extending contact surfaces of base body 22 and cover part 23, prevents an unwanted escape of compressed gas 21 via the annular gap formed between these contact surfaces.

Base body 22 of nozzle insert 20 comprises a sacrificial ring 28 which is connected interchangeably to a base part 29 of base body 22. This sacrificial ring 28 forms a section of passage opening 16 of cover 14, said section abutting through opening 2 of component 1. When component 1 is structured, it can happen that laser beam 10 also strikes this section of passage opening 16, as a result of which sacrificial ring 28 is also structured; this corresponds to the removal of part of the material from which it is formed. Sacrificial ring 28 accordingly represents a wearing part, which can be replaced relatively easily and inexpensively by the releasable connection to base part 29.

In the device according to FIG. 3, annular compressed gas flow 21, which is discharged via outlet opening 15 of cover 14, has a flow direction that is substantially exactly radial with respect to longitudinal axis 26 of passage opening 16. In cooperation with the action of suction device 18, disposed at the corresponding other end of through opening 2 of component 1, this compressed gas flow 21 is then deflected in the direction of through opening 2 of component 1 and thus drawn in, together with ambient gas 30, by compressed gas flow 21, introduced into through opening 2 of component 1.

Figure 4:
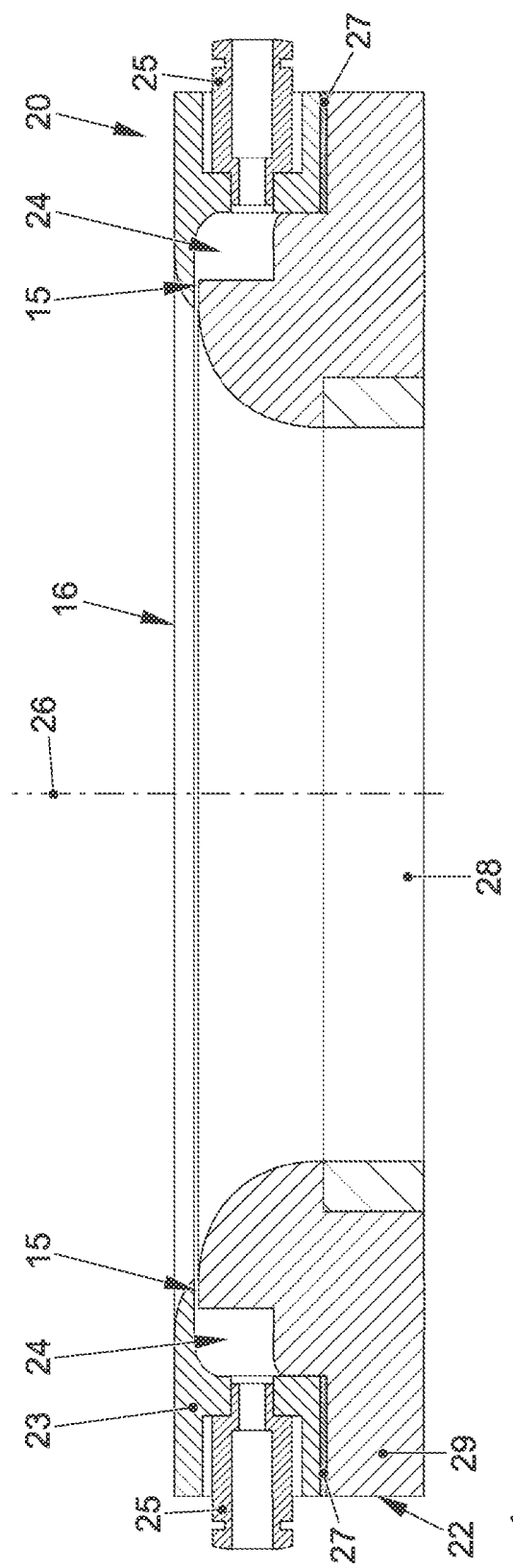
FIG. 4 shows in a longitudinal section a nozzle insert for a cover of a device of the invention.

A nozzle insert 20 of cover 14 that can be used for the device according to FIG. 3 is shown in a more specific embodiment in FIG. 4. Accordingly, this nozzle insert 20 also comprises a base body 22 on which a cover part 23 is placed, wherein between base body 22 and cover part 23, a closed annular circumferential flow channel 24 is formed, which again serves to distribute compressed gas, supplied via a plurality of compressed gas connections 25, opening into this flow channel 24, over the full extent of passage opening 16 of cover 14, said opening delimited by base body 22 and cover part 23 in combination with one another, in order to generate a compressed gas flow 21 which is as uniform as possible over this extent. Outlet opening 15 of nozzle insert 20 is again formed by an annular gap, which lies between base body 22 and cover part 23 and which has a significantly smaller gap width compared with flow channel 24 and an exactly radial and thus vertical orientation with respect to longitudinal axis 26 of passage opening 16. The gap width of outlet opening 15 in the nozzle insert according to FIG. 4 can be adjusted in a relatively simple manner by selecting a specific annular sealing element 27 from a plurality of such sealing elements, which differ in terms of their thickness, and disposing it between the exactly radially extending contact surfaces of base body 22 and cover part 23. This sealing element 27 also prevents an unwanted escape of compressed gas 21 via the annular gap formed between these contact surfaces.

In the device according to FIG. 3, it can additionally be provided that the diameter of circular passage opening 16 of cover 14 is larger than the (optionally identical) diameter of the individual through openings 2 of component 1. In combination with the orientation of laser beam 10 leaving lance 4, said orientation which is inclined with respect to the exactly radial direction, it is thus made possible for an annular section on the corresponding end face of component 1 to be structured by means of laser beam 10.

Figure 7:
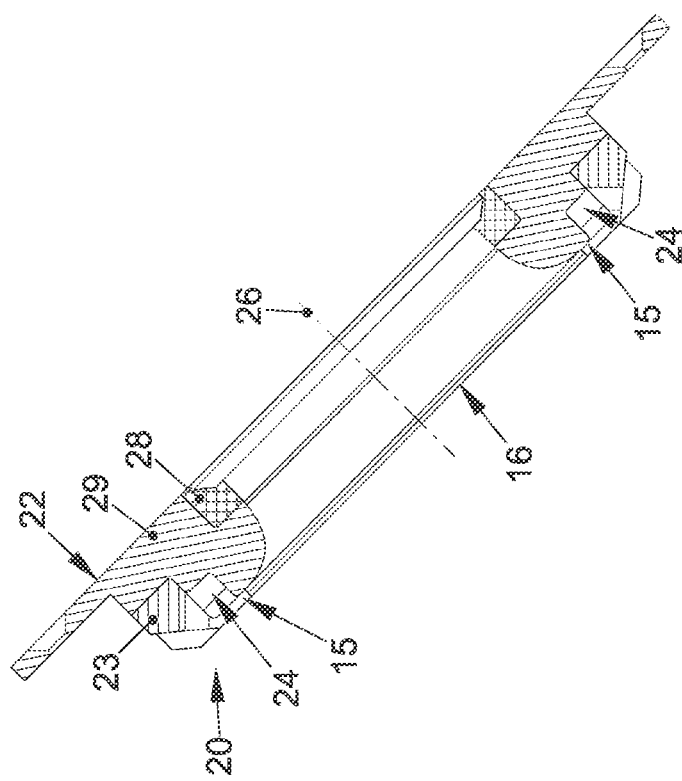
FIG. 7 shows a nozzle insert according to FIG. 6 in a longitudinal section.
Figure 6:
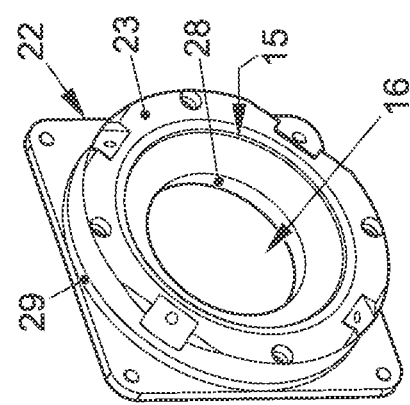
FIG. 6 shows in a perspective view a nozzle insert for a cover of a device of the invention according to a third embodiment.

The embodiment, shown in FIGS. 6 and 7, of a nozzle ring 20 for a cover of the invention corresponds functionally to that according to FIG. 4 and is also made similar to it from a structural point of view. Accordingly, nozzle insert 20 according to FIGS. 6 and 7 also comprises a base body 22, on which a cover part 23 is placed, wherein between base body 22 and cover part 23, a closed annular circumferential flow channel 24 is formed, which serves to distribute compressed gas, supplied via a plurality of compressed gas connections (not visible) which open into this flow channel 24, over the entire extent of passage opening 16 of cover 14, said opening delimited by base body 22 and cover part 23 in combination with one another, in order to generate a compressed gas flow 21 according to FIG. 3 which is as uniform as possible over this extent. Outlet opening 15 of nozzle insert 20 is again formed by an annular gap, which lies between base body 22 and cover part 23 and which has a significantly smaller gap width compared with flow channel 24 and an exactly radial and thus vertical orientation with respect to longitudinal axis 26 of passage opening 16.

The nozzle ring according to FIGS. 6 and 7 differs from nozzle ring 20 according to FIG. 4 in particular in that the passage opening 16 there is larger only in a relatively small section of its longitudinal extent than the diameter of through opening 2 of component 1, wherein this section is adjacent to the side of nozzle ring 20 or cover 14 comprising the same, which is provided for abutting against component 1. In contrast, in a cylindrical section which is adjacent thereto and merges into the rounded section of through opening 16, the diameter is at most as large as that of through opening 2. Specifically, it is provided that passage opening 16 widens conically in the section with an enlarged diameter in the direction of the side provided for abutting against component 1. This conical widening is integrated here into sacrificial ring 28 of base body 22. Such a design of nozzle ring 20, in one respect, preserves the possibility of processing a section of the end face of component 1 by means of laser beam 10, wherein a gas flow which is as advantageous as possible is realized at the same time, because the gas flow can flow into through opening 2 essentially without being deflected by the edge thereof.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for structuring a surface of a through opening in a component, the device comprising
    a lance that is movable into the through opening via a displacement device, the lance adapted to emitting a laser beam from a laser light source in the direction of the surface of the component;
    a cover that is designed for placement on a first end face of the component, the cover forming a passage opening through which the lance is adapted to be moved; and
    a compressed gas feed integrated into the cover, the compressed gas feed comprising a connector for connecting to a pressurized gas source and forming at least one outlet opening at an edge of the passage opening.

2. The device according to claim 1, wherein the at least one outlet opening has a closed, circumferential ring-shaped form.

3. The device according to claim 2, wherein the at least one outlet opening is a single opening that continuously extends in a ring around an entire circumference of the passage opening.

4. The device according to claim 1, wherein the at least one outlet opening generates a pressurized gas flow which, when exiting from the at least one outlet opening, is oriented perpendicular or parallel with respect to a longitudinal axis of the passage opening.

5. The device according to claim 1, wherein the passage opening is designed as widening.

6. The device according to claim 1, wherein the cover comprises a base body and a cover part, which in combination with one another form the passage opening, wherein the at least one outlet opening is formed by a gap, located between the base body and the cover part.

7. The device according to claim 1, wherein an edge of the passage opening that is situated facing away from a side of the cover that is designed to lie adjacent to the component is rounded.

8. The device according to claim 1, further comprising a suction device for drawing off gas out of the through opening, wherein the suction device is designed for placement at a second end face of the component.

9. The device according to claim 1, wherein the lance is configured such that the laser beam is emitted at an angle, which is included by the longitudinal axis of the lance and deviates from 90°.

10. The device according to claim 1, wherein the at least one outlet opening is provided on a plane that extends perpendicular to a longitudinal axis of the passage opening.

11. A combination of the device according to claim 1 and the component having the through opening.

12. The combination according to claim 11, wherein the component has a plurality of through openings, wherein the cover is designed such that when the passage opening of the cover is brought into overlap with one of the plurality of through openings of the component, remaining through openings of the plurality of through openings are covered by the cover.

13. The combination according to claim 11, wherein a diameter of the passage opening of the cover, on a side that abuts against the component, is larger than a diameter of the through opening of the component.

14. The combination according to claim 13, wherein the diameter of the passage opening is larger than the diameter of the through opening of the component only in sections with respect to a longitudinal extent of the passage opening.

15. The combination according to claim 14, wherein the sections of the passage opening having the larger diameter widen in the direction of the side of the cover that abuts against the component.

16. The combination according to claim 11, wherein the component is a cylinder crankcase for an internal combustion engine.

* * * * *